United States Patent [19]

Conkey et al.

[11] Patent Number: 4,743,628
[45] Date of Patent: May 10, 1988

[54] POLYURETHANE FOAMS INCORPORATING ALKOXYLATED AROMATIC DIAMINE AND ACETYLENIC GLYCOL

[75] Inventors: James B. Conkey, Catasauqua; Glenn A. Taylor, Allentown, both of Pa.

[73] Assignee: Air Products and Chemicals, Inc., Allentown, Pa.

[21] Appl. No.: 893,857

[22] Filed: Aug. 6, 1986

[51] Int. Cl.$^4$ ............................................. C08G 18/30
[52] U.S. Cl. ................................ 521/163; 252/182.18; 521/167; 521/174; 528/75; 528/167; 424/49
[58] Field of Search ............... 252/182; 521/163, 167, 521/174; 528/75, 167; 424/49

[56] References Cited

U.S. PATENT DOCUMENTS

| | | | |
|---|---|---|---|
| 3,268,593 | 8/1966 | Carpenter et al. | 424/49 |
| 3,423,344 | 1/1969 | Odinark et al. | 260/2.5 |
| 3,580,869 | 5/1971 | Rhodes et al. | 260/2.5 |
| 3,948,825 | 4/1976 | Pray | 260/2.5 |
| 4,235,977 | 11/1980 | Frisch et al. | 528/75 |
| 4,243,759 | 1/1981 | Haas | 521/167 |
| 4,296,212 | 10/1981 | Ewen et al. | 521/167 |
| 4,444,915 | 4/1984 | Grube et al. | 521/131 |
| 4,517,383 | 5/1985 | Korczak et al. | 564/443 |
| 4,555,418 | 11/1985 | Snider et al. | 252/182 |
| 4,562,290 | 12/1985 | Korczak et al. | 252/182 |

FOREIGN PATENT DOCUMENTS 1398185 6/1975 United Kingdom.

Primary Examiner—Maurice J. Welsh
Assistant Examiner—Sam A. Acquah
Attorney, Agent, or Firm—Russell L. Brewer; James C. Simmons; William F. Marsh

[57] ABSTRACT

This invention relates to crosslinker systems for polyurethane foams and a process for producing such foams. The polyurethanes are prepared by reacting an organic polyisocyanate with an organic compound having active Zerewitenoff hydrogen atoms, e.g., a polyol with an alkoxylated aromatic diamine crosslinker and an acetylenic glycol. Improved properties can be achieved, such as, higher load-bearing at equivalent foam density; higher tear; higher elongation and higher air flow.

20 Claims, No Drawings

4,743,628

POLYURETHANE FOAMS INCORPORATING ALKOXYLATED AROMATIC DIAMINE AND ACETYLENIC GLYCOL

TECHNICAL FIELD

This invention relates to polyurethane foams.

BACKGROUND OF THE INVENTION

The manufacture of polyurethane foams, whether rigid, or flexible, and whether the foam is microcellular or macrocellular, and whether the cellular structure is either open or closed, is widely known. Rigid foams are used for insulation and structural apparatus while flexible foams have wide usage in applications requiring cushioning. Cushioning applications are found in furniture, bedding and seats and other padded or cushioned interior for automobiles.

Polyurethane foams are prepared by reacting a polyisocyanate with a polyol and a crosslinker, typically an aromatic diamine or multifunctional, short chain polyol, with added fillers, catalysts and blowing agents. Rigid foams will require a higher level of crosslinking agent, while the flexible foams will have a lesser crosslink density than the rigid foams. Several properties are required in polyurethane systems for flexible foam, and include processing characteristics of the polyurethane system itself to permit handling, blending of the components, and filling of the mold. Efforts are continually being made to produce higher load bearing systems at equal density or equal load bearing at a lower density. In addition, fast demold and cycle times, reduced scrap, good tensile strength and so forth are required. To meet these requirements, crosslinkers have been used in various concentrations and types. One set of goals is to produce higher load-bearing, tear and elongation values. Other goals are to have materials which can be blended easily and require little to no crushing when open cell structure is desired.

Representative patents which show the production of both rigid and flexible foams utilizing a polyisocyanate, polyol and aromatic diamines as a crosslinker, including alkoxylated aromatic diamines are as follows:

British Patent No. 1,398,185 discloses a process for producing flexible polyurethane foams by reacting a polyisocyanate with a polyol and a crosslinker system comprising an aromatic diamine/alkylene oxide reaction product. Toluenediamine/propylene oxide reaction products are shown. These aromatic amine/alkylene oxide reaction products increase the hardness of the resulting foam without consuming a substantial amount of isocyanate.

U.S. Pat. No. 3,580,869 discloses a process for producing microcellular polyurethane foams by reacting toluenediisocyanate with a polyol and an aromatic diamine, as well as, a propoxylated aniline.

U.S. Pat. No. 4,444,915 discloses a rigid polyisocyanurate foam prepared from a polyisocyanate, a polyol and an alkoxylated alkylamine as a crosslinking agent.

U.S. Pat. No. 3,948,825 discloses a process for producing cellular polyurethane foams which utilizes a conventional urethane formulation crosslinked with a system consisting of an alkylene oxide of methylene dianiline and more specifically an ethylene oxide/propylene oxide adduct of methylene dianiline.

U.S. Pat. No. 4,243,759 discloses the use of alkoxylated toluenediamines as a crosslinking agent for polyurethane foam systems. Ethylene oxide and propylene oxide adducts of toluenediamine are suggested as being suitable candidates for the crosslinking system.

U.S. Pat. No. 4,517,383 discloses a use of an alkylene oxide adduct of aniline for reducing viscosity of an polyurethane foam formulation.

U.S. Pat. No. 3,423,344 discloses a process for producing polyurethane polyol systems containing hydroxyalkylated polyamines which enhance the compressive strength and resistance to volume change under humid and dry aging conditions. The polyol component of the polyurethane formulation comprises a hydroxyalkylated polyamine formed by reacting ethylene or propylene oxide with an amine equivalent of a polyamine such as methylene dianiline and a polyol.

SUMMARY OF THE INVENTION

This invention relates to a polyurethane system for producing foams having outstanding properties by the reaction of a polyisocyanate, a polyol, and a crosslinking system comprising an alkoxylated aromatic diamine and an acetylenic glycol. The utilization of an acetylenic glycol, including alkoxylated acetylenic glycols, in combination with an alkoxylated aromatic diamine in the polyurethane foam formulation produces a system which has outstanding physical properties. Some of the advantages associated with polyurethane systems containing acetylenic glycols/alkoxylated aromatic diamines include:

a polyurethane system having high cure rate;
a crosslinker system which permits one to reduce the foam density while maintaining load bearing;
a crosslinker system which permits increasing load bearing while maintaining foam density;
a polyurethane system having both a high tear strength and elongation;
a flexible polyurethane system having high initial air flow (cell openness).
a polyurethane system having acceptable viscosity for easy handling by molders; and
aromatic diamine/alkoxylated aromatic diamine crosslinker systems which are compatible with many commercial resin blends.

DETAILED DESCRIPTION OF THE INVENTION

In the preparation of polyurethane foam systems of this invention, an organic polyisocyanate is reacted with a polyol and crosslinked with a crosslinking system. Various preparation techniques are known and can be used. One technique is sometimes used for microcellular elastomers (i.e., shoe soles) or rigid foam involves forming a quasi-prepolymer by reacting a short chain polyol with the isocyanate and then synthesizing the polyurethane by injecting the organic polyisocyanate quasi prepolymer, polyol and crosslinking system into a mold simultaneously and reacting the mixture. A second technique used in the manufacture of polyurethane systems is the prepolymer technique wherein the organic polyisocyanate is first reacted with a polyol to form a prepolymer and then the prepolymer injected into the mold along with a crosslinking system for subsequent crosslinking of the resin. Another technique for flexible foam is called the 'one shot', wherein the hard segment, which enhances the load-bearing property, is made by radical polymerization of a monomer such as, acyronitrile or styrene or condensation polymerization of monomers such as hydrazine and toluenediisocyanate and subsequent stabilization in a base polyol. This polymer polyol is a 'PHD' polyol.

Organic polyisocyanates which can be used in the manufacture of polyurethane systems typically are produced by the phosgenation of aromatic diamines or aliphatic amines. Examples of aromatic diisocyanates which can be utilized include toluene diisocyanate, typically as an 80/20 mixture by weight of the 2,4- and 2,6-toluene diisocyanate mix. Other isocyanates which can be used include methylene diphenyl isocyanate, toluidine diisocyanate, m-xylene diisocyanate, 1,5-naphthylene diisocyanate and others conventionally used in the manufacture of polyurethane systems. Aliphatic isocyanates can also be utilized in the manufacture of polyurethane systems and these representative isocyanates include hexamethylene-1,6-diisocyanate and tetramethylene-1,4-diisocyanate and so forth.

Other components utilized in the manufacture of polyurethane foam systems include organic compounds having at least two active Zerewitenoff hydrogen atoms, e.g. polyols which are, by and large long chain polyols having a molecular weight of from about 300-5,000; they also comprise alkylene oxide reaction products of aliphatic diols and triols. Typically, the aliphatic oxides used in preparing the alkylene oxide reaction products include ethylene oxide, propylene oxide and butylene oxide, but primarily ethylene and propylene oxide or mixtures of the two. Typical polyols include polypropylene glycol and ethylene oxide capped polypropylene glycol. These alkylene oxide adducts are sometimes reacted with short chain diols such as ethylene glycol, propylene glycol, butanediol and triols such as trimethylol propane and hexane triol. Also, dimer acid-based polymers, e.g., adipate ethers of diols and triols and caster oil-polyol based systems can be used. The utilization of polyether and polyester polyols are well known and representative polyether and polyester polyols are shown in U.S. Pat. No. 4,555,418 and are incorporated by reference.

The crosslinking system for the polyurethane formulation is based upon the use of an alkoxylated aromatic diamine and its use in combination with an acetylenic glycol. One of the basic objections to aromatic diamines is that they react too rapidly with polyurethane forming systems to permit injection of the formulation into a mold. In addition, they often result in increased shrinkage during the cure process. Hindered aromatic amines having a longer pot life than nonhindered aromatic diamines are best suited for that type of processing. Even so, most of the hindered aromatic diamines are too reactive for foam formulation. Reactivity of the aromatic amines has been altered by forming alkylene oxide adducts of these aromatic diamines. The alkylene oxide adducts are formed by reacting an alkylene oxide, e.g., a $C_2$ to $C_6$ alkylene oxide with an aromatic diamine and thereby introduce aliphatic ether units into the amine. They are represented by the formula or coupled as a biphenyl group:

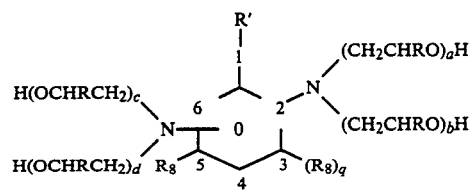

wherein a, b, c, and d are integers with this sum being from 1-15, $R'$ represents $CH_3$, or diorgano $C_{1-6}$ amide, $R_8$ represents hydrogen or $C_{1-4}$ alkyl, and q is 0 or 1.

Aromatic diamines, which include substituted diamines, suited for producing alkoxylated derivatives thereof include methylene dianiline; methylene bis-(orthochloroaniline); toluenediamine, xylenediamine, diethyltoluenediamine (2,4- and 2,6-isomers); diisopropyltoluenediamine; 3-tertiary-butyl-2,6-toluenediamine, 5-tertiary-butyl-2,4-toluenediamine; 5-isopropyl-2,4-toluenediamine; 3-isopropyl-2,6-toluenediamine; 5-cyclopentyl-2,4-toluenediamine; 3-cyclopentyl-2,6-toluenediamine; N,N-dimethoxyethyl 2,4-diamino-benzamide and N,N-diisopropyl 2,4-diamino-benzamide. As can be noted from the general structure of aromatic diamines, both biphenyl and mononuclear systems can be utilized and the ring may be substituted with various substituents, e.g., alkyl groups, ester, $C_{1-6}$ amide, aliphatic ether and halogen groups, the substituent being preselected to perform a specific function, e.g., lengthening reaction time, etc. Optionally, other crosslinkers can be added as desired, e.g., small portions of aromatic diamines such as methylene bis-(orthochloroaniline).

Various alkylene oxides, e.g., ethylene oxide, propylene oxide, butylene oxide or mixtures can be reacted with the aromatic diamines to produce the desired alkoxylated derivative. Often a mixture of two alkylene oxides is used instead of one. A mixture often produces different reactivities than either when used alone. Ethylene and propylene oxide are the preferrred oxides for synthesis of the alkoxylated derivatives of aromatic diamines. The mole ratio of alkylene oxide to aromatic diamine should be sufficient to provide an average of about from 1 to 6 alkylene oxide units per mole of aromatic diamine and preferably 1.5-2.5 groups. Of the above aromatic diamines suited for crosslinking purposes, alkylated derivatives or hindered aromatic diamines have performance advantages over nonhindered. Although they are somewhat slower in reactivity, they can be formulated over a wider range of conditions. Diethylene toluenediamine reacted with ethylene or propylene oxide or mixtures provides for excellent performance as do the tertiary-butyl-toluenediamine derivatives. Representative alkylene oxide adducts of aromatic amines and diamines are shown in several of the references cited in the background of the invention, e.g., 4,555,418 and 3,580,869 and are incorporated by reference.

The acetylenic glycols used as a crosslinker component in the polyurethanes are represented by the formula:

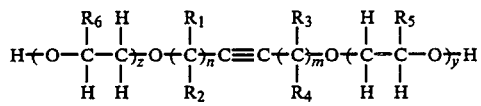

wherein y and z range from 0–6 and the sum does not exceed 7; m and n combined range from 1–10; $R_1$, $R_2$, $R_3$, $R_4$, $R_5$ and $R_6$ are hydrogen or methyl groups and may be like or unlike in the structure. Examples of acetylenic glycols having good performance characteristics include 2,4,7,9-tetramethyl-5-decyne-4–7 diol and 7,10-dimethyl-8-hexadecyne-7,10-diol and alkoxylated derivatives where the sum of y and z does not exceed 7 and preferably 1.5–4.5 are preferred. A particularly preferred alkoxylated derivative is the ethylene oxide adduct of 2,4,7,9-tetramethyl-5-decyne-4,7-diol. Representative acetylenic glycols and ethoxylated counterparts are set forth also in U.S. Pat. Nos. 3,293,191 and 3,268,593 and are incorporated by reference.

The crosslinker formulation of alkoxylated aromatic diamine and acetylenic glycol is added to the urethane foam formulation at a level of from about 1 to 15% by weight, based on the polyol component. The weight % of alkoxylated aromatic diamine in the crosslinker formulation or system will range from about 40–95% by weight and preferably 85–95% by weight, the balance being the acetylenic glycol.

Although not intending to be bound by theory, it is believed the ability of the acetylenic glycols and alkoxylated derivatives thereof to reduce shrinkage of the urethane parts and enhance specific physical properties in the resulting polyurethane system is because they alter the viscosity in a strong hydrogen bonding system and thereby provide for a more uniform distribution of the crosslinking diamine component in the polyurethane formulation. The non-acetylenic glycol type surfactants display plasterization character when used under these conditions relative to the acetylenic glycols. The latter have both unique surface interface modification properties and an ability to incorporate into the polymer network when applied to the resin blend and injected into a mold along with the diisocyanate. The acetylenic glycols are also believed to interact with low solubility (high viscosity) components and increase their miscibility in the resin system. This feature also enhances distribution and thereby results in greater uniformity of the flexible foam composition. Higher air flow foams are achieved as a result of decreased tensile strength of the cell membrane during foam formation. The crosslinker material improves the cell wall strength and because of better distribution of the reactants cell structure becomes improved. As a result equal load is achieved at lower density. Other viscosity modifiers or surfactant systems, although added in similar amounts to the acetylenic glycols, apparently cause irreversible interruption of bonding and thereby adversely affect the physical properties of the foam. Because of an apparent nonuniform distribution of crosslinker diamine there are "pockets" of high crosslinker density and pockets of low crosslink density "in the resulting polyurethane system". By the utilization of the acetylenic glycol/crosslinker mixture, a polyurethane system, based upon a given formulation, will often have greater load bearing at a given density and will exhibit greater tear strength, while at the same time having no adverse affect, and in most cases display greater elongation property than its counterpart produced without an acetylenic glycol/crosslinker mixture, or with conventional wetting agents, i.e., Tergitol ® NP-4.

As with conventional polyisocyanate systems, catalysts which catalyze trimerization of isocyanates to form isocyanurates or catalyze the reaction of the isocyanate with hydroxyl groups in the polyol to form polyurethanes or catalyze the reaction of isocyanates with diamines to form polyureas can be employed. Catalysts are used in amounts recommended in the art, and examples of such catalysts include tertiary amines which are represented by triethylenediamine, triethylamine, N-methylmorpholine, N-ethylmorpholine, N,N-diethylethanolamine and the like.

The foam density of the products is regulated by techniques well-known in the art, and typically this control of density is exercised by regulating the amount of water present in the foam mixture or by using a blowing agent or combination of water an blowing agent. Common blowing agents include aliphatic hydrocarbons or halogenated hydrocarbons, e.g. butane, trichloromonofluoromethane, chlorotrifluoromethane and so forth.

Other additives used in the manufacture of polyurethane systems for specific purposes can be used in the practice of this invention, and these include flame retardants, stabilizers, cell regulators and so forth. An example of a cell regulator is a organosilicone polymer.

The following examples are intended to illustrate various embodiments of the invention and are not intended to restrict the scope thereof.

EXAMPLE 1

Preparation of Hydroxyethyltertiarybutyl toluenediamine

A 1,000 ml three-neck, round bottom flask was charged with 178 grams (1 mole) of a mixture consisting of 80 parts by weight 5-tertiary butyl-2,4-toluenediamine and 20 parts of a 3-tertiary-butyl-2,6-toluenediamine mixture. The tertiary-butyl-toluenediamine was prepared by reacting an 80:20 toluenediamine commercial mix with isobutylene in the presence of an H-Y zeolite catalyst. After charging the tertiarybutyl-toluenediamine to the flask, 176 grams (2 moles) of ethylene carbonate were charged to the vessel and the contents stirred. The ethylene carbonate dissolved readily in the tertiary-butyl-toluenediamine and a clear amber solution resulted. The contents were heated to a temperature of about 150° C. and at such time carbon dioxide evolution appeared. Heating was continued until a temperature reached about 260° C. during which time carbon dioxide gas evolution ceased. Approximately 1.7 cubic feet or 2.2 moles of carbon dioxide recovered from the vessel.

At the completion of the reaction, a viscous, dark brown, glassy product was present in the vessel. The product was recovered by heating slightly to permit agitation. A vacuum was applied slowly until a pressure of 15 mm mercury was reached. The temperature was maintained at 110° C. and carbon dioxide withdrawn. After substantially all of the dissolved carbon dioxide was removed, the temperature was raised to approximately 127° C. and a distillate fraction collected. The distillate fraction constituted 11.2 grams material leaving a residue of approximately 250 grams of hydroxyethylated tertiary-butyl-toluenediamine. Analytical test results showed the product had a hydroxyl number of 613 ml KOH/gram of material.

EXAMPLE 2

Preparation of Hydroxypropyldiethyltoluenediamine

The procedure of Example 1 was utilized except that propylene oxide was substituted for ethylene carbonate and diethyltoluenediamine substituted for tertiarybutyl-toluenediamine. Experimental procedures had shown there was essentially no difference in using either the carbonate or oxide form in producing the alkylene oxide derivatives. The reactor was purged with nitrogen and 96 pounds of a 2,4- 2,6-diethyltoluenediamine (80:20) mixture was added to the reactor. The contents were heated to 140° C. and the pressure adjusted to 5 psig. Then, the 63 pound quantity of propylene oxide was added incrementally and regulated so the pressure in the reactor did not exceed 60 psig. After all of the reactants were in the reactor, the reaction was continued, with agitation, for 2 hours. The reaction product was recovered by stripping residual propylene oxide from the reaction mixture under vacuum. The yield was 159 pounds of product with the percent of product having the following molar oxide substitution: 0 moles, 1.5%; 1 mole, 12.4%; 2 moles, 45.9%; 3 moles, 32.6% and 4 moles or greater, 7.7%.

EXAMPLE 3

Ethylene Oxide Adduct of DETDA

The procedure of Example 2 was repeated except that 47 pounds ethylene oxide were substituted for propylene oxide. The percent distribution of ethylene oxide reacted was 0 moles 2.5%; 1 mole 15.7%; 2 moles 45.4%; 3 moles 29.7% and 4 moles 6.7%. The yield was 142 pounds.

EXAMPLE 4

Preparation of High Resiliency Foam Formulation

High resiliency polyurethane foams were prepared using conventional hand-mix and machine mix techniques. The formulation set forth in Table 1 was used and the results from physical testing are set forth in Table 2.

TABLE 1

HR FOAM FORMULATION

COMPONENT PARTS BY WEIGHT

|  | A (Cont) | A' (CE) | B (Cont) | B' (CE) | C (Cont) | C' (CE) |
|---|---|---|---|---|---|---|
| Polyol (OH~34) | 60 | 80 | 60 | 80 | 60 | 80 |
| Polymer Polyol | 40 | 20 | 40 | 20 | 40 | 20 |
| Water | 3.5 | 3.8 | 3.5 | 3.8 | 3.5 | 3.8 |
| Diethanolamine (DEOA) | 1.5 | — | 1.5 | — | 1.5 | — |
| Silicone Surfactant | 1.8 | 1.8 | 1.8 | 1.8 | 1.8 | 1.8 |
| HETBTDA | — | 4.0 | — | 4.0 | — | 4.0 |
| T-125 | 0.007 | 0.007 | 0.007 | 0.007 | 0.007 | 0.007 |
| (BL-11, X-8162) Amine Catalyst | 0.70 | 0.70 | 0.70 | 0.70 | 0.70 | 0.70 |
| TDI Index (varied) | 95 | 90 | 100 | 100 | 110 | 110 |
| S ® 82 | — | 0.4 | — | 0.4 | — | 0.4 |

Polyol OH~34 is a propylene oxide adduct of glycerin end capped with ethylene oxide having a hydroxyl number of 34.
Polymer polyol is a commercial polyol having acrylonitrile and styrene grafted thereon and sold under the trademark Niax ® 34-28 from Union Carbide Corporation.
HETBTDA is hydroxyethyl tertiary-butyl-toluenediamine of Example 1.
BL-11 is blowing amine catalyst from Air Products and Chemicals, Inc.
X-8162 is a triethylenediamine and dimethylaminoethylmorpholine catalyst mixture from Air Products and Chemicals, Inc.
TDI index refers to the equivalent ratio of toluenediisocyanate to the Zerewitenoff hydrogens present in the polyol and crosslinker system, 1:1 being stoichiometric.
Cont refers to the control which employed grafted acryonitrile/styrene as the hard segment.
CE refers to crosslinker experimental using HETBTDA as the crosslinker.
DABCO ® T-125 refers to dibutyl-tin-bis-isoctylmaleate from Air Products and Chemicals, Inc.
S-82 refers to Surfynol ® 82, a trademark for a surfactant glycol 2,4,7,9-tetramethyl-5-decyne-4,7-diol from Air Products and Chemicals, Inc.

TABLE 2

| COMPONENT | A (Cont) | A' (CE) | B (Cont) | B' (CE) | C (Cont) | C' (CE) |
|---|---|---|---|---|---|---|
| Index | 95 | 90 | 100 | 100 | 110 | 110 |
| Air flow (CFS) | 0.80 | 1.26 | 0.95 | 1.77 | 1.26 | 2.41 |
| Tensile (LBS) | 21.7 | 24.7 | 22.4 | 22.9 | 21.6 | 23.0 |
| Elongation (%) | 166.3 | 210.7 | 153.0 | 168.0 | 134.0 | 166.6 |
| Tear (lbs/in) | 2.10 | 2.81 | 1.97 | 2.21 | 1.72 | 1.77 |
| Humid Age Comp Set (50%) | 29.9 | 33.0 | 28.2 | 35.0 | 26.1 | 38.2 |
| Core Density (PCF) | 1.8 | 1.8 | 1.8 | 1.7 | 1.7 | 1.5 |
| 25% IFD/p psi | 12.8 | 12.4 | 14.4 | 14.7 | 16.7 | 17.9 |
| 65% IFD/p psi | 36.0 | 36.6 | 40.4 | 46.3 | 49.5 | 54.2 |
| SAG (65/25 IFD) | 2.8 | 3.0 | 2.8 | 3.2 | 3.0 | 3.0 |
| 50% Compression Set (%) | 11.8 | 17.6 | 8.9 | 15.7 | 7.3 | 13.0 |

The above results show that the load bearing at 65% IFD was higher in each case where the crosslinker comprised the HETBTDA as compared to the standard commercial polymer polyol material. In addition, tear strength had increased without decrease in % elongation. As noted in the Examples A'-C', the % elongation actually increased. Air flows were also better than obtained with the commercial formulation.

EXAMPLE 5

HETBTDA AND HPDETDA (CROSSLINKER)

High resilient foams were prepared in conventional manner utilizing the formulations as noted in Table 3. Table 4 sets forth the results from testing. It should be noted that the control formulation did not perform as well at the 3.5 water level as the crosslinker blend of this patent.

TABLE 3

|  | A Control | B Control | A' HETBTDA | B' HETBTDA | A" HPDETDA | B" HPDETDA |
|---|---|---|---|---|---|---|
| Voranol ® 4701 | 100 | 100 | 100 | 100 | 100 | 100 |
| Diisopropanolamine | 5.1 (solid) | 5.1 | — | — | — | — |
| HETBTDA | — | — | 4.0 | 4.0 | — | 4.0 |
| HPDETDA | — | — | — | — | 4.0 | 4.0 |
| Silicone 4113 | 1.0 | 1.0 | 1.0 | 1.0 | 1.0 | 1.0 |
| S-82 | — | — | 0.4 | 0.4 | 0.4 | 0.4 |
| Triethylenediamine (crystal) | 0.35 | — | 0.35 | — | 0.35 | — |
| BL-11, X-8162 | — | 0.75 | — | 0.75 | — | 0.75 |
| Water (total) | 2.6 | 3.5 | 2.60 | 3.5 | 2.60 | 3.5 |
| TDI - 80/20 | 39.0 | 39.0 | 39.0 | 39.0 | 39.0 | 39.0 |
| MDI (Mondur ® 44V20 | 9.7 | 9.7 | 9.7 | 9.7 | 9.7 | 9.7 |
| TDI Index | 110 | 110 | 110 | 110 | 110 | 110 |

Voranol ® 4701 is a propylene oxide adduct of glycerin having a hydroxyl number of 32–36.5, a functionality of 3, a molecular weight of 4800 and viscosity of 415 to 455 cps at 100° F. and is obtained from Dow Chemical Corporation.
TDI is toluenediisocyanate (2,4- and 2,6-toluenediisocyanate mixture of 80:20 by weight).
MDI is methylenediisocyanate and sold under the trademark Mondur ® 44VC20.
HETBTDA is a crosslinker system of HETBTDA from Example 1.
HPDETDA is a crosslinker system of hydroxypropyldiethyltoluenediamine from Example 2.
BL-11, X-8162 is a commercial amine catalyst from Air Products and Chemical, Inc.
S-82 refers to a Surfynol ® 82 surfactant consisting of 2,4,7,9-tetramethyl-5-decyne-4,7-diol from Air Products and Chemicals, Inc. (The crosslinker system comprised 90 parts alkoxylated toluenediamine to 10 parts S-82 by weight.)

TABLE 4
PHYSICAL TEST

|  | A (Cont) | B (Cont) | A' HETBTDA | B' HETBTDA | A" HPDETDA | B" HPDETDA |
|---|---|---|---|---|---|---|
| Air flow (CFS) | 2.87 | ↑ | 3.21 | 3.2 | 2.9 | 3.21 |
| Tensile (LBS) | 15.3 | ↑ | 18.3 | 16.9 | 15.3 | 18.3 |
| Elongation (%) | 81.4 | UNACCEPT- | 97.9 | 96.0 | 97.9 | 96.0 |
| Tear (lbs/in) | 1.18 | ABLE | 1.54 | 1.79 | 1.54 | 1.79 |
| Humid Age Comp Set (50%) | 15.6 | FOR | 16.5 | 28.0 | 15.6 | 17.3 |
| Core Density (PCF) | 2.72 | TESTING | 2.94 | 2.06 | 2.72 | 2.06 |
| 65% IFD (PSI) | 173 | ↓ | 189 | 129 | 189 | 129 |
| 50% IFD | 112 | ↓ | 121 | 81 | 121 | 81 |
| 25% IFD | 65 | ↓ | 70 | 45 | 70 | 45 |
| SAG | 2.7 | ↓ | 2.7 | 2.9 | 2.7 | 2.9 |
| Compression Set | 3.99 | ↓ | 5.74 | 8.6 | 4.0 | 5.7 |
| Demold (min) | 8.5 | Collapse | 6.5 | 8.5 | 6.5 | 8.5 |
| Cure % | 96 | ↓ | 99 | 96 | 99 | 96 |
| Ext/gel | 38/43 | ↓ | 39/44 | 22/27 | 39/44 | 22/27 |

The above results show that the crosslinker system containing the ethoxylated or propoxylated aromatic amine and acetylenic glycol give better air flow, tear resistance, and % elongation than a commercial formulation using diisopropanolamine as the crosslinker. At higher water levels (3.5php), the commercial crosslinker formulation using diisopropanolamine would not produce stable foam.

EXAMPLE 6
EFFECT OF SURFYNOL ® ACETYLENIC GLYCOL

To illustrate the effect of added Surfynol ® fluids, highly resilient foam formulations were prepared from the following formulations. The level of acetylenic glycol was varied and is expressed as percent by weight of polyol. The formulations are given in Table 5; physical testing of data is given in Table 6.

The significant changes in the tables are shrinkage and viscosity of the crosslinker blend.

TABLE 5

| RUN | 1 | 2 | 3 | 4 |
|---|---|---|---|---|
| Surfynol ® 82 surfactant % | 0 | 2 | 5 | 10 |
| Polyol (Voranol ® 4702) | 82 | 82 | 82 | 82 |
| Polymer Polyol (Niax ® 28-34) | 18 | 18 | 18 | 18 |
| Diethanolamine | 0.2 | 0.2 | 0.2 | 0.2 |
| Silicone Surfactant | 1.5 | 1.5 | 1.5 | 1.5 |
| $H_2O$ | 3.8 | 3.8 | 3.8 | 3.8 |
| BL-11 | 0.15 | 0.15 | 0.15 | 0.15 |
| X-8162 | 0.55 | 0.55 | 0.55 | 0.55 |
| DABCO ® T-120 | 0.007 | 0.007 | 0.007 | 0.007 |
| HETBTDA | 4.0 | 4.0 | 4.0 | 4.0 |
| TDI (as Index) | 43.9 | 43.9 | 43.9 | 43.9 |

Voranol ® 4702 is a propylene oxide adduct of glycerin from Dow Chemical Corp.
Polymer Polyol (Niax ® 28-34) is a polyol having acrylonitrile and styrene grafted thereon and sold by Union Carbide Corporation.
DABCO ®T-120 is dibutyl-tin-dilaurate sold by Air Products and Chemicals, Inc.
HETBTDA is hydroxyethyl tertiary-butyl-toluenediamine of Example 3.
Surfynol ® 82 is a trademark for commercial surfactant consisting of 2,4,7,9-tetramethyl-5-decyne-4,7-diol from Air Products and Chemicals, Inc.
TDI is toluenediisocyanate (80:20 mix of the 2,4-/2,6-isomer)
X-8162 is a commercial amine catalyst mixture from Air Products and Chemicals, Inc.

TABLE 6
Effect of Acetylenic Glycol
PHYSICAL TEST

| Run | 1 | 2 | 3 | 4 |
|---|---|---|---|---|
| Surfynol ® 82% | 0 | 2 | 5 | 10 |
| Air flow (CFS) | 0.85 | 0.98 | 0.89 | 0.97 |
| 50% IFD/p | 29.9 | 33.4 | 32.0 | 30.1 |
| Tensile (LBS) | 17.3 | 19.6 | 19.7 | 16.8 |
| Elongation (%) | 155 | 151 | 158 | 144 |
| Tear (lbs/in) | 2.85 | 2.84 | 2.92 | 2.72 |
| Humid Age Comp Set (50%) | 36.8 | 37.5 | 37.6 | 31.0 |

TABLE 6-continued

Effect of Acetylenic Glycol
PHYSICAL TEST

| Run | 1 | 2 | 3 | 4 |
|---|---|---|---|---|
| Core Density (PCF) | 1.87 | 1.97 | 1.96 | 1.93 |
| 65% IFD (PSI) | 83.4 | 97.0 | 92.4 | 84.8 |
| 50% IFD | 56.0 | 66.1 | 62.7 | 58.2 |
| 25% IFD | 33.1 | 39.8 | 37.5 | 35.4 |
| 25 R | 48.0 | 41.5 | 46.0 | 44.8 |
| SAG | 2.48 | 2.44 | 2.46 | 2.40 |
| Shrinkage | 1.75 | 0.75 | 0.25 | 0.00 |
| Viscosity Crosslinker (cps) | 8600 | 4800 | 3900 | 1800 |
| Cure % Recovery (10 sec.) | 71.8 | 72.6 | 73.3 | 76.4 |
| Ext/gel (sec) | 27/37 | 27/37.5 | 28/37 | 26.9/36.1 |

The major properties imparted by the acetylenic glycol is in reduced viscosity and reduced shrinkage. Shrinkage was reduced to a negligable amount at the 10% level and reduced substantially from the 0% concentration level and levels even as low as 2%.

EXAMPLE 7

A high relilient foam formulation was evaluated using a condensation type 'polymer polyol' commonly called 'PHD' as filler for purposes of giving a comparison to the flexible foam formulation of Example 4 which used a graft type 'polymer polyol' as filler. The crosslinker of Example 2 was used. The results are shown in Tables 7, 8 and 9. The foam was made on a commercial machine by EMB.

It should be noted that control formulations employed two types of catalysts. One catalyst was believed to be the best with the control formulation while the use of the other catalyst provides a direct comparison with the HPDETDA crosslinker formulations.

TABLE 7

| COMPONENT | A (CONT) | A' (CE) | A" (CONT) | B (CONT) | B' (CE) | B" (CONT) | C (CONT) | C' (CE) | C" (CONT) |
|---|---|---|---|---|---|---|---|---|---|
| VORANOL ® 4702 | 60 | 80 | 60 | 60 | 80 | 60 | 60 | 80 | 60 |
| Multranol ® E-9151 | 40 | 20 | 40 | 40 | 20 | 40 | 40 | 20 | 40 |
| HPDETDA | — | 4.0 | — | — | 4.0 | — | — | 4.0 | — |
| S-82 | — | 0.44 | — | — | 0.44 | — | — | 0.44 | — |
| H₂O | 4.2 | 4.5 | 4.2 | 4.2 | 4.5 | 4.2 | 4.2 | 4.5 | 4.2 |
| DC-5043 | 1.5 | 1.5 | 1.5 | 1.5 | 1.5 | 1.5 | 1.5 | 1.5 | 1.5 |
| DEOA | 1.5 | 0.2 | 1.5 | 1.5 | 0.2 | 1.5 | 1.5 | 0.2 | 1.5 |
| BL-11 | 0.15 | 0.15 | 0.15 | 0.15 | 0.15 | 0.15 | 0.15 | 0.15 | 0.15 |
| 33 LV | 0.55 | — | — | 0.55 | — | — | 0.55 | — | — |
| X-8154 | — | 0.25 | 0.25 | — | 0.25 | 0.25 | — | 0.25 | 0.25 |
| PC-77 | — | 0.25 | 0.25 | — | 0.25 | 0.25 | — | 0.25 | 0.25 |
| T-125 | 0.007 | 0.007 | 0.007 | 0.007 | 0.007 | 0.007 | 0.007 | 0.007 | 0.007 |
| TDI Index | 95 | 90 | 95 | 100 | 100 | 100 | 110 | 110 | 110 |

Voranol ® 4702 is a propylene oxide adduct of glycerin sold by Dow Corp.
Multranol ® E-9151 is a polymer polyol (amine stabilized) sold by Mobay Corp.
HPDETDA is the hydroxypropyldiethyltoluenediamine product of Example 2
Surfynol ® 82 is a commercial acetylenic glycol sold by Air Products and Chemicals, Inc.
DC-5043 is a silicone surfactant sold by Dow-Corning.
DEOA is diethanolamine
BL-11;33 LV ™; and X-8154 are commercial amine catalysts for polyurethanes sold by Air Products and Chemicals, Inc.
PC-77 is a commercial amine catalyst sold by Air Products and Chemicals, Inc.
DABCO ® T-125 is dibutyl-tin-bis-isoctylmaleate sold by Air Products and Chemicals, Inc.

TABLE 8

| | A (CONT) | A' (CE) | A" (CONT) | B (CONT) | B' (CE) | B" (CONT) | C (CONT) | C' (CE) | C" (CONT) |
|---|---|---|---|---|---|---|---|---|---|
| Index | 95 | 90 | 90 | 100 | 100 | 100 | 110 | 110 | 110 |
| Cream Time | 3 | 4 | 4 | 3 | 4 | 4 | 3 | 4 | 4 |
| Extrusion Time (Sec) | 27 | 31 | 31 | 26 | 28 | 28 | 27 | 31 | 31 |
| Gel Time (Sec) | 36 | 39 | 39 | 36 | 39 | 39 | 37 | 40 | 41 |
| Flowability | Fair | Good | Good | Fair | Good | — | Fair | — | Fair |
| Stability (0–4) (Best–Worst) | 0.5 | 1.5 | 1.5 | 1.5 | 1.5 | 1.5 | 1.0 | — | — |
| Tightness[1] | V.T. | V.T. | V.T. | V.T. | V.T. | V.T. | T | V.T. | V.T. |
| Demold Time | ← | ← | ← | ← | 5 Min. | → | → | → | → |

[1]V.T. = Very Tight, T = Tight

Viscosity of the crosslinker blend was reduced substantially with increased concentration of S-82 surfactant.

TABLE 9

| | A (CONT) | A' (CONT) | A" (CE) | B (CONT) | B' | B" | C | C' | C" |
|---|---|---|---|---|---|---|---|---|---|
| Index | 95 | 90 | 90 | 100 | 100 | 100 | 110 | 110 | 110 |
| Air Flow (CPS) | 0.81 | 1.26 | 1.31 | 0.95 | 1.77 | 1.31 | 1.26 | 2.41 | 1.58 |
| Tensile (lbs) | 21.7 | 24.7 | 23.7 | 22.4 | 22.9 | 22.6 | 21.6 | 23.0 | 21.4 |
| Elongation (%) | 166.3 | 210.8 | 161.8 | 153.7 | 168.0 | 156.2 | 134.0 | 166.6 | 123.3 |
| TEAR (lbs/in) | 2.10 | 2.80 | 2.00 | 1.97 | 2.21 | 1.93 | 1.72 | 1.77 | 1.69 |
| Humid Age Compression Set (50%) % | 29.9 | 33.0 | 31.7 | 28.0 | 35.0 | 32.0 | 26.0 | 38.0 | 34.0 |
| Core Density (PCF) | 1.79 | 1.79 | 1.84 | 1.79 | 1.66 | 1.73 | 1.68 | 1.53 | 1.72 |
| 65% IFD (psi) | 36.0 | 37.0 | 33.0 | 40.4 | 46.3 | 36.0 | 49.5 | 54.2 | 42.2 |
| 25%/p IFD (psi) | 12.8 | 12.4 | 11.5 | 14.4 | 14.7 | 12.1 | 16.7 | 17.9 | 14.3 |

TABLE 9-continued

|  | A (CONT) | A' (CONT) | A" (CE) | B (CONT) | B' | B" | C | C' | C" |
|---|---|---|---|---|---|---|---|---|---|
| SAG (65%/25%) | 2.8 | 3.0 | 2.9 | 2.8 | 3.2 | 3.0 | 3.0 | 3.0 | 3.0 |

Table 8 shows that the crosslinker HPDETDA processed as well as the control system with Table 9 also showing better results for tear and % elongation, also for airflow, particularly at the 100 and 110 indexes.

TABLE 9

|  | A (CONT) | A' (CONT) | A" (CE) | B (CONT) | B' | B" | C | C' | C" |
|---|---|---|---|---|---|---|---|---|---|
| Index | 95 | 90 | 90 | 100 | 100 | 100 | 110 | 110 | 110 |
| Air Flow (CPS) | 0.81 | 1.26 | 1.31 | 0.95 | 1.77 | 1.31 | 1.26 | 2.41 | 1.58 |
| Tensile (lbs) | 21.7 | 24.7 | 23.7 | 22.4 | 22.9 | 22.6 | 21.6 | 23.0 | 21.4 |
| Elongation (%) | 166.3 | 210.8 | 161.8 | 153.7 | 168.0 | 156.2 | 134.0 | 166.6 | 123.3 |
| TEAR (lbs/in) | 2.10 | 2.80 | 2.00 | 1.97 | 2.21 | 1.93 | 1.72 | 1.77 | 1.69 |
| Humid Age Compression Set (50%) % | 29.9 | 33.0 | 31.7 | 28.0 | 35.0 | 32.0 | 26.0 | 38.0 | 34.0 |
| Core Density (PCF) | 1.79 | 1.79 | 1.84 | 1.79 | 1.66 | 1.73 | 1.68 | 1.53 | 1.72 |
| 65% IFD (psi) | 36.0 | 37.0 | 33.0 | 40.4 | 46.3 | 36.0 | 49.5 | 54.2 | 42.2 |
| 25%/p IFD (psi) | 12.8 | 12.4 | 11.5 | 14.4 | 14.7 | 12.1 | 16.7 | 17.9 | 14.3 |
| SAG (65%/25%) | 2.8 | 3.0 | 2.9 | 2.8 | 3.2 | 3.0 | 3.0 | 3.0 | 3.0 |

EXAMPLE 8

The procedure of Example 7 was repeated but with two different types of alkoxylated toluenediamine derivatives, i.e., HPDETDA and HEDETDA of Examples 2 and 3. The formulations are shown in Table 10, and the physical properties in Table 11.

TABLE 10

| COMPONENT Run | CONTROL A, B, C, D | HEDETDA E, F, G, H | HPDETDA I, J, K, L |
|---|---|---|---|
| Voranol ® 4702 | 60 | 80 | 80 |
| Multrano ® E-1951 | 40 | 20 | 20 |
| Crosslinker Diamine | — | 4.0 | 4.0 |
| H₂O | 4.2 | 4.5 | 4.5 |
| DC-5043 | 1.5 | 1.5 | 1.5 |

TABLE 10-continued

| COMPONENT Run | CONTROL A, B, C, D | HEDETDA E, F, G, H | HPDETDA I, J, K, L |
|---|---|---|---|
| DEOA | 1.5 | 0.2 | 0.2 |
| 33 LV | 0.55 | 0.55 | 0.55 |
| BL-11 | 0.15 | 0.15 | 0.15 |
| T-125 | 0.007 | 0.007 | 0.007 |
| S-82 | 0 | 0.4 | 0.4 |
| TDI Index | 100 | 100 | 100 |

Voranol ® 4702 is a propylene oxide adduct of glycerin sold by Dow Corp.
Multranol ® E-9151 is a polymer polyol (amine stabilized) sold by Mobay Corp.
HEDETDA is the hydroxyethyldiethyltoluenediamine product of Example 3.
HPDETDA is the hydroxypropyldiethyltoluenediamine product of Example 2
S-82 is a commercial acetylenic glycol (Surfynol ® 82) sold by Air Products and Chemicals, Inc.
DC-5043 is a silicone surfactant sold by Dow-Corning.
DEOA is diethanolamine
BL-11;33 LV; and X-8154 are commercial amine catalysts for polyurethanes sold by Air Products and Chemicals, Inc.
PC-77 is a commercial amine catalyst sold by Air Products and Chemicals, Inc.
DABCO ® T-125 is dibutyl-tin-bis-isoctylmaleate sold by Air Products and Chemicals, Inc.

TABLE 11

CROSSLINKER RUNS

| PROCESS DATA | INDEX | EXT SEC | GEL SEC | EXT. WT. GMS | PAD WT GMS | PAD WT DEN | DENSITY KG/CM₃ (CORE) | MOLD TEMP (°C.) |
|---|---|---|---|---|---|---|---|---|
| CONTROL | | | | | | | | |
| A | 101 | 21 | 29 | 36.0 | 474.7 | 28.2 | 27.0 | 60° C. |
| B | 101 | 21 | 28 | 38.8 | 474.4 | 27.7 | 27.1 | 60° C. |
| C - FLOW | 101 | 19 | 28 | 17.6 | 298.7 | — | — | 60° C. |
| D - FLOW | 101 | 19 | 28 | 28.9 | 294.1 | — | — | 60° C. |
| HEDETDA | | | | | | | | |
| E | 100 | 20 | 27 | 48.2 | 450.8 | 26.9 | 25.9 | 60° C. |
| F | 100 | 19 | 26 | 38.9 | 452.8 | 26.9 | 26.0 | 60° C. |
| G - FLOW | 100 | 20 | 26 | 11.8 | 291.9 | — | — | 57° C. |
| H- FLOW | 100 | 19 | 27 | 18.5 | 287.4 | — | — | 57° C. |
| HPDETDA | | | | | | | | |
| I | 100 | 22 | 30 | 44.5 | 463.8 | 27.6 | 26.1 | 56° C. |
| J | 100 | 22 | 30 | 50.3 | 448.6 | 27.2 | 25.9 | 60° C. |
| K - FLOW | 100 | 20 | 29 | 40.3 | 277.0 | — | — | 60° C. |
| L - FLOW | 100 | 20 | 29 | 29.0 | 280.8 | — | — | 57° C. |

| PROCESS DATA | CURE 10/5 SEC | FLOW CM | INSTA-BILITY[1] | TEAR N/M | 25% IFD N/323 CM[2] | AIR FLOW L/SEC | SAG |
|---|---|---|---|---|---|---|---|
| CONTROL | | | | | | | |
| A | 86%/99% | — | — | 245 | 80 | 0.56 | 2.99 |
| B | 90%/100% | — | — | 245 | 80 | 0.56 | 3.02 |
| C - FLOW | 94%/96% | 53.79 | 1.5 | — | — | — | — |
| D - FLOW | 86%/100% | 33.9 | 1.5 | — | — | — | — |
| HEDETDA | | | | | | | |
| E | 94%/100% | — | — | 280 | 76 | 0.75 | 3.02 |
| F | 90%/99% | — | — | 280 | 80 | 0.66 | 2.96 |
| G - FLOW | 71%/91% | 31.36 | 1.0 | — | — | — | — |

TABLE 11-continued

| | CROSSLINKER RUNS | | | | | | |
|---|---|---|---|---|---|---|---|
| H - FLOW HPDETDA | 78%/93% | 35.00 | 1.5 | — | — | — | — |
| I | 91%/98% | — | — | 333 | 93 | 0.66 | 2.95 |
| J | 86%/100% | — | — | 315 | 89 | 0.66 | 2.97 |
| K - FLOW | 74%/93% | 31.3 | 1.5 | — | — | — | — |
| L - FLOW | 80%/93% | 41.8 | 1.5 | — | — | — | — |

¹(0) BEST–(3) WORST

The above data shows a lower cure density for the systems prepared with HEDETDA and HPDETDA than the control. It also shows that the systems provided higher tear, with the HPDETDA crosslinker having the highest tear values of any crosslinker. The IFD value and flow cm are in a comparable range to the control. Air flows are also higher.

EXAMPLE 9

A high resilient foam formulation was evaluated for purposes of giving a comparison between an acetylenic glycol type surfactant i.e., the Surfynol ®82 surfactant to a non-acetylenic glycol surfactant. The non-acetylenic surfactant which also possessed wetting and defoamer character are represented by Tergitol ®NP-4 a surfactant from Union Carbide which is an ethoxylated nonylphenol. The formulation is given in Table 12 and physical properties in Table 13.

TABLE 12

| | A Acetylenic Glycol | B Control |
|---|---|---|
| VORANOL ® 4702 | 80 | 80 |
| MULTRANOL ® E-9151 | 20 | 20 |
| HPDETDA | 4.0 | 4.0 |
| Surfynol ® 82 | 0.44 | — |
| Tergitol ® NP-4 | — | 0.44 |
| DC-5043 | 1.5 | 1.5 |
| 33 LV | 0.5 | 0.5 |
| BL-11 | 0.15 | 0.15 |
| T-125 | 0.007 | 0.007 |
| H₂O | 4.2 | 4.2 |
| TDI | 49.9 | 49.9 |
| NCO Index | 100 | 100 |

Voranol ® 4702 is a propylene oxide adduct of glycerin sold by Dow Corp.
Multranol ® E-9151 is a polymer polyol (amine stabilized) sold by Mobay Corp.
HPDETDA is the product of Example 2
S-82 is a commercial acetylenic glycol (Surfynol ® 82) sold by Air Products and Chemicals, Inc.
DC-5043 is a silicone surfactant sold by Dow-Corning.
DEOA is diethanolamine
BL-11, 33, LV and X.8154 are commercial amine catalysts for polyurethanes sold by Air Products and Chemicals, Inc.
PC-77 is a commercial amine catalyst sold by Air Products and Chemicals, Inc.
DABCO ® T-125 is dibutyl tin bis isoctylmaleate sold by Air Products and Chemicals, Inc.
Tergitol ® NP-4 is nonylphenol ethoxylate sold by Union Carbide Corp.

TABLE 13

| Physical Test | A | B |
|---|---|---|
| DENSITY (PCF) | 1.70 | 1.69 |
| AIR FLOW (CFS) | 1.90 | 2.00 |
| TEAR (LBS./IN.) | 1.76 | 1.68 |
| ELONGATION (%) | 128.0 | 112.0 |
| TENSILE (LBS.) | 13.6 | 11.9 |
| 25% IFD (PSI) | 25.7 | 25.4 |
| 65% | 72.4 | 73.1 |
| SAG (65%/25%) | 2.81 | 2.88 |
| INDEX | 100 | 100 |

TENSILE, TEAR AND ELONGATION ARE IMPROVED FOR ACETYLENIC GLYCOLS VERSUS NON-ACETYLENIC GLYCOL FORMULATIONS.

It is clear from Table 13 that a surfactant having wetting and/or defoamer character is not sufficient to meet many of the goals set forth. Although a lower viscosity and improved blending property is achieved, green strength is poorer with the nonacetylenic glycol. Also, foams containing Terigtol ®NP-4 often split when crushed. This was not observed for foams using the S-82 surfactant.

The following is a summary of comparison of such properties:

| Property | Nonacetylenic Glycol NP-4 | Acetylenic Glycol S-82 |
|---|---|---|
| η Density | + | + |
| Blending | + | ++ |
| Shrinkage | + | + |
| Green Strength | + | ++ |
| Tear | − | + |
| Elongation | + | + |
| Air Flow | + | + |
| Viscosity Reduction | + | + |

Note: (−) = Bad, (+) = good, (++) = very good
Note: Rating relative to standard commercial formulation using DEOA.

EXAMPLE 10

A high resilient foam formulation was prepared in a manner similar to Example 4 and evaluated for purposes of giving a comparison between a crosslinker system consisting of alkoxylated aromatic diamine and an acetylenic glycol surfactant, i.e., Surfynol ®82, and a crosslinker system of alkoxylated aromatic diamine without acetylenic glycol, i.e., without Surfynol ®82 surfactant added. Table 14 provides formulation data and Table 15 provides results of physical property testing.

When the acetylenic glycol, S-82 is absent from the crosslinker system, blending is difficult. Table 15 also shows that the major significant difference between the foams is air flow. It appears the acetylenic glycol surfactant enhances the normally poor properties of shrinkage, air flow, and handling associated with many crosslinkers, in particular, the alkoxylated aromatic toluenediamines such as diethyltoluenediamine and tertiary-butyl-toluene diamine derivatives. Table 14 sets forth the formulation and Table 15 provides some physical properties of these formulations. Runs A, B, B″ and C contained no acetylenic glycol as part of the crosslinker system.

TABLE 14

| | A | A' | B | B' | B″ | B‴ | C | C' |
|---|---|---|---|---|---|---|---|---|
| Polyol (SF5505) | 80 | 80 | 80 | 80 | 80 | 80 | 80 | 80 |
| Multranol ® E-9151 | 20 | 20 | 20 | 20 | 20 | 20 | 20 | 20 |
| HPDETDA | 4.0 | 4.0 | 4.0 | 4.0 | 4.0 | 4.0 | 4.0 | 4.0 |
| S-82 | — | 0.44 | — | 0.44 | — | 0.44 | — | 0.44 |
| DC-5043 | 1.5 | 1.5 | 1.5 | 1.5 | 1.5 | 1.5 | 1.5 | 1.5 |
| H₂O | 4.5 | 4.5 | 4.5 | 4.5 | 4.5 | 4.5 | 4.5 | 4.5 |
| DEOA | 0.2 | 0.2 | 0.2 | 0.2 | 0.2 | 0.2 | 0.2 | 0.2 |
| BL-11 | 0.15 | 0.15 | 0.15 | 0.15 | 0.15 | 0.15 | 0.15 | 0.15 |
| PC-77 | — | — | — | — | 0.25 | 0.25 | — | — |
| X-8154 | — | — | — | — | 0.25 | 0.25 | — | — |
| X-8162 | 0.5 | 0.5 | 0.5 | 0.5 | — | — | 0.5 | 0.5 |

TABLE 14-continued

|  | A | A' | B | B' | B'' | B''' | C | C' |
|---|---|---|---|---|---|---|---|---|
| T-125 | 0.007 | 0.007 | 0.007 | 0.007 | 0.007 | 0.007 | 0.007 | 0.007 |
| TDI | 90 | 90 | 100 | 100 | 100 | 100 | 110 | 110 |

Polyol OH~34 is a propylene oxide adduct of glycerin end capped with ethylene oxide having a hydroxyl number of 34.
Polymer polyol is a commercial polyol having acrylonitrile and styrene grafted thereon and sold under the trademark Niax ® 34-28 from Union Carbide Corporation.
HEPPETDA is hydroxypropyl diethyltoluenediamine of Example 2.
BL-11 is blowing amine catalyst from Air Products and Chemicals, Inc.
X-8162 is an amine catalyst mixture from Air Products and Chemicals, Inc.
TDI index refers to the equivalent ratio of toluenediisocyanate to the Zerewitenoff hydrogens present in the polyol and crosslinker system, 1:1 being stoichiometric.
DABCO ® T-125 refers to dibutyl tin bis isoctylmaleate from Air Products and Chemicals, Inc.
S-82 refers to Surfynol ® 82, a trademark for a surfactant glycol 2,4,7,9-tetramethyl-5-decyne-4,7-diol from Air Products and Chemicals, Inc.

TABLE 15

|  | Physical Test | | | | | | | |
|---|---|---|---|---|---|---|---|---|
|  | A | A' | B | B' | B'' | B''' | C | C' |
| Index | 90 | 90 | 100 | 100 | 100 | 100 | 110 | 110 |
| Air Flow (CFS) | 0.99 | 1.26 | 1.02 | 1.77 | 0.75 | 1.31 | 1.42 | 2.41 |
| TEAR (lbs/in) | 2.9 | 2.8 | 2.3 | 2.2 | 2.2 | 2.4 | 2.0 | 1.8 |
| Elongation (%) | 223.8 | 210.7 | 175.7 | 168.0 | 143.7 | 139.0 | 140.0 | 166.6 |
| Tensile (lbs) | 25.4 | 24.7 | 22.4 | 22.9 | 18.2 | 18.0 | 21.5 | 23.0 |
| Core Density (PCF) | 1.72 | 1.79 | 1.62 | 1.66 | 1.59 | 1.61 | 1.60 | 1.53 |
| 25% IFD (psi) | 23.0 | 22.0 | 25.0 | 24.0 | 34.9 | 36.7 | 25.3 | 27.4 |
| 65% IFD | 68.7 | 65.6 | 75.7 | 76.9 | 85.7 | 84.0 | 77.9 | 82.9 |
| SAG (65%/25%) | 3.0 | 3.0 | 3.0 | 3.2 | 2.5 | 2.3 | 3.1 | 3.0 |
| Ball Rebound | 41 | 45 | 41 | 44 | 38 | 40 | 42 | 47 |
| Humid Age Compression Set (50%) | 33 | 33 | 35 | 35 | — | — | 36 | 38 |

What is claimed is:

1. In a polyurethane foam formulation comprising an organic polyisocyanate, polyol, blowing agent and crosslinker system, the improvement which comprises including a crosslinker system of an alkoxylated aromatic diamine and an acetylenic glycol represented by the formula:

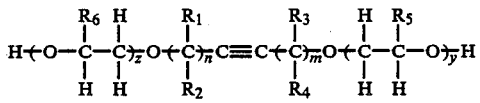

wherein y and z range from 0-6 but the sum of y and z does not exceed 7; m and n combined range from 1 to 10, and $R_1$, $R_2$, $R_3$, $R_4$, $R_5$ and $R_6$ are hydrogen or methyl groups and may be like or unlike in the structure.

2. The formulation of claim 1 wherein the alkoxylated aromatic diamine is included in an amount of from 1 to 15 percent by weight of the polyol and the weight percent of alkoxylated aromatic diamine in the crosslinker system is from 40-95%.

3. The formulation of claim 2 wherein said polyol is a polymeric polyol having a molecular weight of from about 3,000 to 5,000.

4. The formulation of claim 3 wherein said alkoxylated aromatic diamine is an ethoxylated or propoxylated aromatic diamine and y and z in said acetylenic glycol are 0.

5. The formulation of claim 4 wherein said acetylenic glycol is an ethoxylated or propoxylated acetylenic glycol having from about 2-4 ethoxy or propoxy groups per molecule.

6. The formulation of claim 4 wherein said ethoxylated or propoxylated aromatic diamine is an ethoxylated or propoxylated $C_{1-4}$ alkyl derivative of toluenediamine.

7. The formulation of claim 6 wherein the ethoxylated or propoxylated alkyl derivative of toluenediamine is an ethoxylated or propoxylated diethyl toluenediamine or tertiary-butyl-toluenediamine.

8. The formulation of claim 7 wherein the average number of ethylene oxide or propylene oxide units in said ethoxylated or propoxylated diethyltoluenediamine or tertiary-butyl-toluenediamine is from 1.5-2.5.

9. The formulation of claim 8 wherein the acetylenic glycol is 2,4,7,9-tetramethyl-5-decyne-4,7-diol or 7,10-dimethyl-8-hexadecyne-7,10-diol.

10. A crosslinker system suitable for producing flexible polyurethane foams comprising an alkoxylated toluenediamine derivative and an acetylenic glycol represented by the formula:

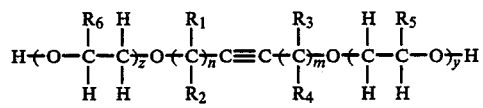

wherein y and z range from 0-6 and the sum of y and z does not exceed 7; m and n combined range from 1-10; and $R_1$, $R_2$, $R_3$, $R_4$, $R_5$ and $R_6$ are hydrogen or methyl groups may be like or unlike in the structure and the weight % of said alkoxylated toluenediamine is from 40-95% by weight of the crosslinker system.

11. The crosslinker system of claim 10 wherein said alkoxylated toluenediamine derivative is an alkoxylated $C_{2-6}$ alkylated derivative of toluenediamine and y and z in said acetylenic glycol are 0.

12. The crosslinker system of claim 11 wherein the weight percentage of alkoxylated alkylated toluenediamine derivative in said crosslinker system is from 85 to 95 and the weight percentage of alkoxylated acetylenic glycol is from 5 to 15%.

13. The crosslinker system of claim 12 wherein said alkoxylated alkylated toluenediamine derivative is an ethylene oxide or propylene oxide $C_{2-6}$ alkylated toluenediamine derivative.

14. The crosslinker system of claim 13 wherein in said acetylenic glycol $R_1$ and $R_3$ are H.

15. The crosslinker system of claim 10 wherein said acetylenic glycol 2,4,7,9,-tetramethyl-5-decynediol or 7,10-dimethyl-8-hexadecyne-7,10-diol and said alkoxylated alkylated toluenediamine derivative is an ethoxylated or propoxylated diethyltoluenediamine or tertiary-butyl-toluenediamine.

16. The crosslinker system of claim 13 wherein said alkoxylated alkylated toluenediamine derivative is an ethoxylated or propoxylated derivative of diethyltoluenediamine and the average number of ethylene oxide or propylene oxide units is from 1.5 to 2.5, and the acetylenic glycol is an ethylene oxide adduct of 2,4,7,9-tetramethyl-5-decyne-4,7-diol having an average of 1.5–4.5 moles ethylene oxide incorporated herein and the weight percent of alkoxylated alkylated derivative of toluenediamine is from 85–95% of the crosslinker system.

17. In a process for the manufacture of polyurethane foams which comprises reacting under foam-forming conditions an organic polyisocyanate, a polyether polyol having a molecular weight from about 3,000 to 6,000 and an aromatic diamine/alkylene oxide crosslinker, the improvement which comprises including a crosslinker system of an alkylene oxide adduct of a $C_{2-6}$ alkyl derivative of toluenediamine with the general formula:

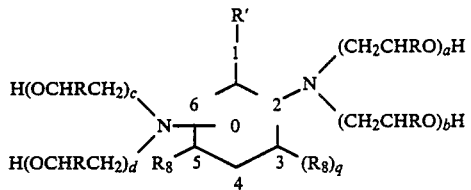

wherein a, b, c, and d are integers with this sum being from 1–15, R' represents $CH_3$, or diorgano $C_{1-6}$ amide, $R_8$ represents hydrogen, or $C_{1-4}$ alkyl group, and q is 0 or 1, and an acetylenic glycol of the formula:

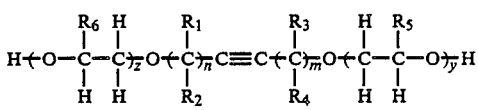

wherein y and z range from 0–6 and the sum of y and z does not exceed 7; m and n combined range from 1–6; and $R_1$, $R_2$, $R_3$, $R_4$, $R_5$ and $R_6$ are hydrogen or methyl groups and may be like or unlike in the structure.

18. A process of claim 17 wherein said alkylene oxide adduct is an ethylene oxide or propylene oxide adduct of diethyltoluenediamine or tertiary-butyl-toluenediamine.

19. The process of claim 18 wherein said acetylenic glycol is 2.4,7,9-tetramethyl-5-decyne-4,7 diol.

20. The process of claim 19 wherein said crosslinker system contains from 40–95% by weight of the alkylene oxide adduct of diethyltoluenediamine or tertiary-butyl-toluenediamine.

* * * * *